P. EVANS.
CHAIN CASE FOR MOTOR VEHICLES.
APPLICATION FILED DEC. 20, 1911.
1,118,848.
Patented Nov. 24, 1914.
3 SHEETS—SHEET 1.
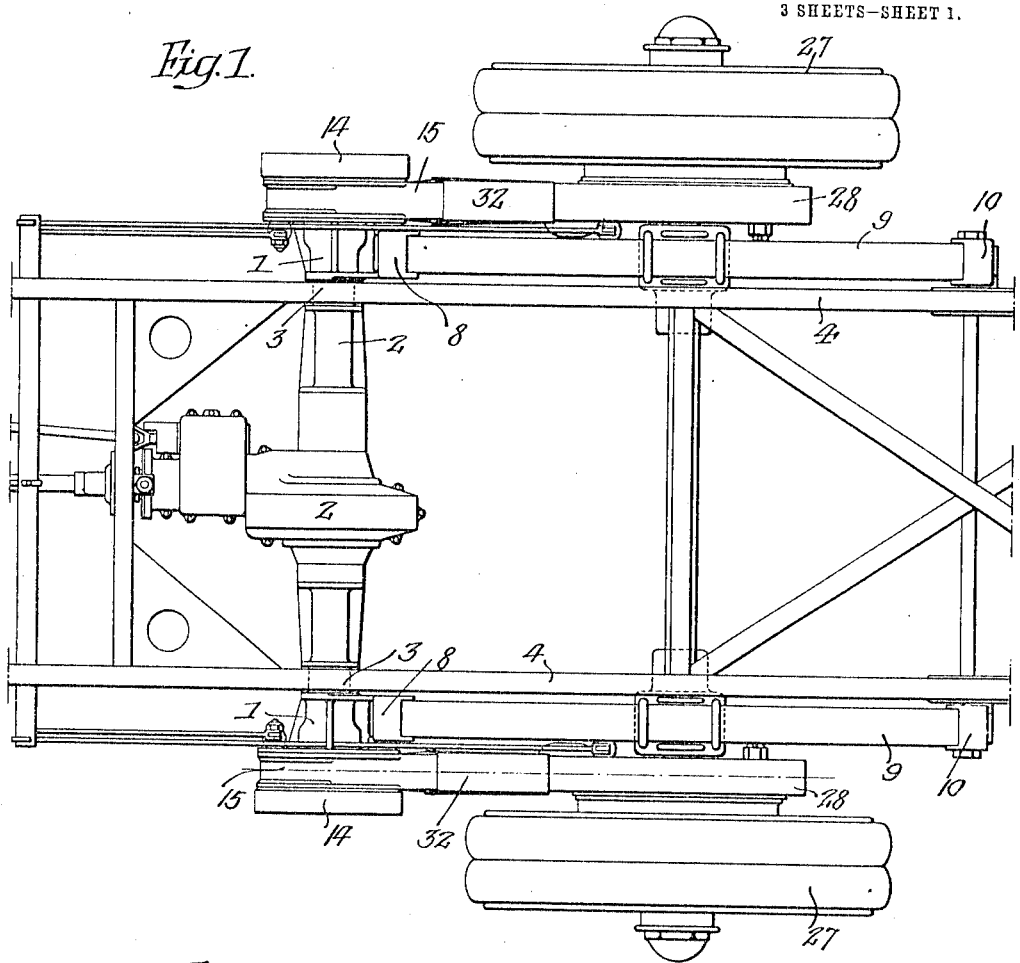
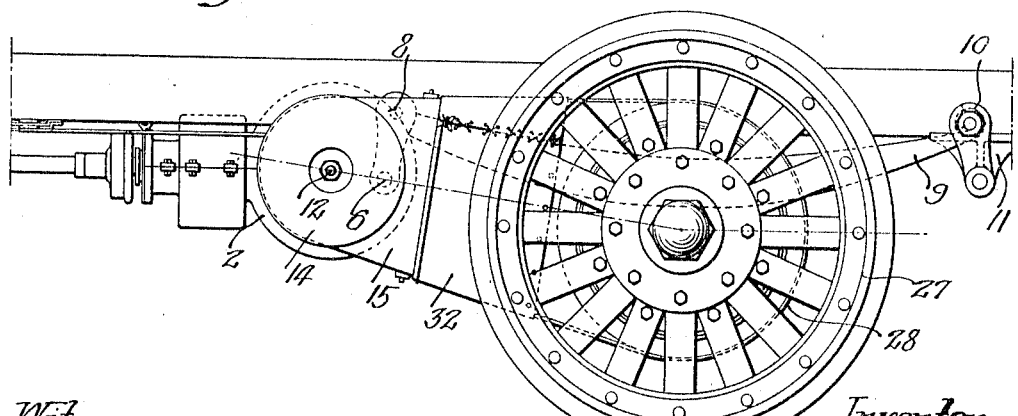
Witnesses:—
William H. Rivoir
Willis A. Burrowes
Inventor:—
Powell Evans.
by his Attorneys
Howson & Howson

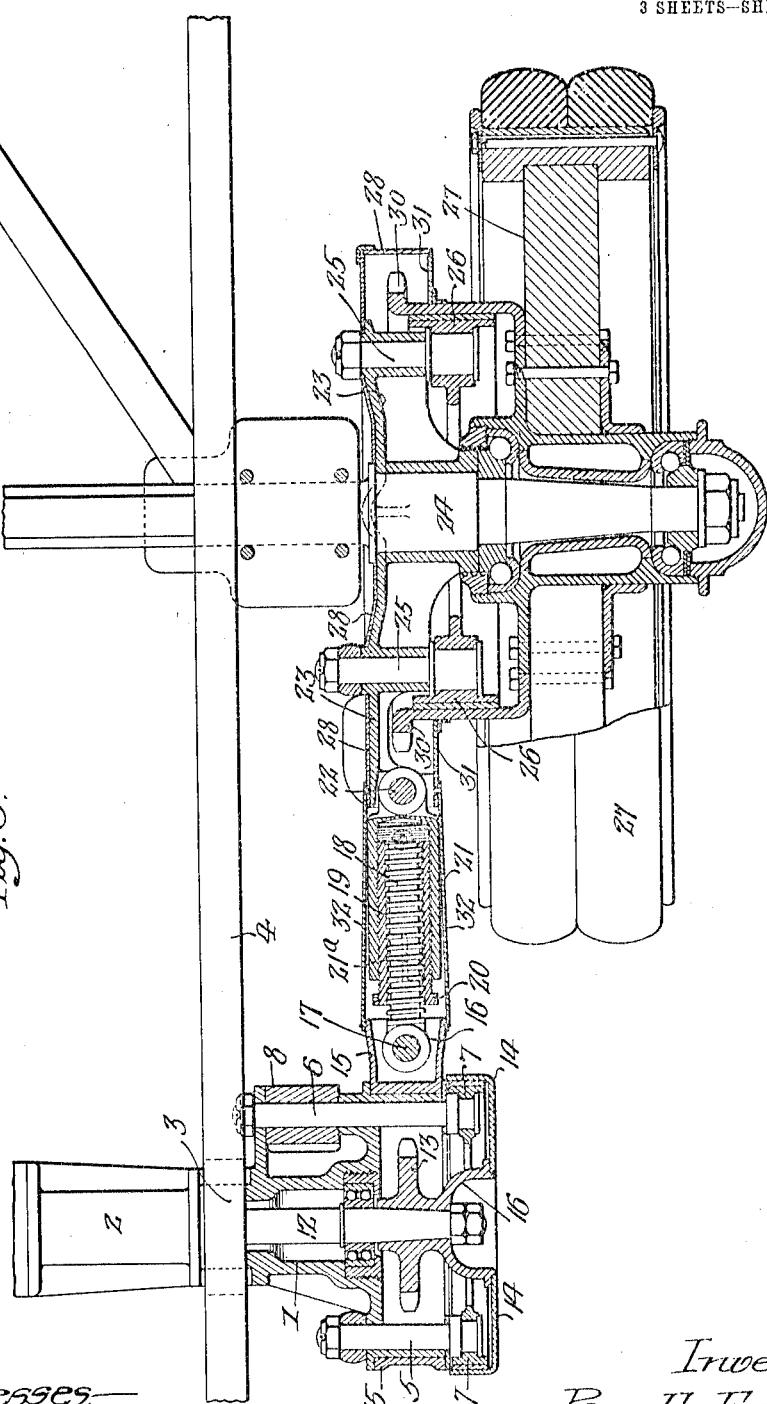

P. EVANS.
CHAIN CASE FOR MOTOR VEHICLES.
APPLICATION FILED DEC. 20, 1911.
1,118,848.
Patented Nov. 24, 1914.
3 SHEETS—SHEET 3.
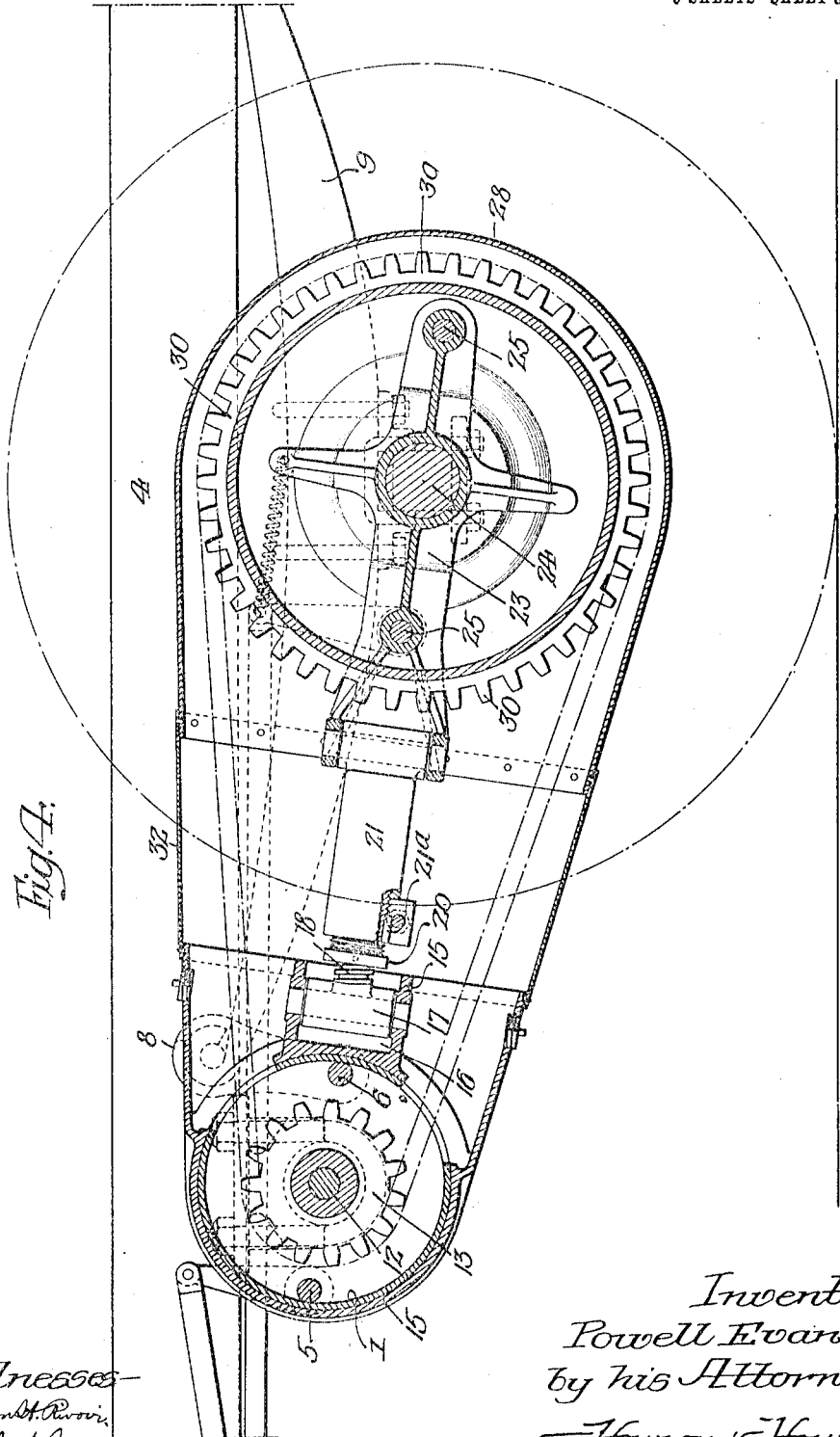
Witnesses
William H. Rivoir
Wills A. Burrowes
Inventor:
Powell Evans.
by his Attorneys:
Howson & Howson

UNITED STATES PATENT OFFICE.

POWELL EVANS, OF PHILADELPHIA, PENNSYLVANIA.

CHAIN-CASE FOR MOTOR-VEHICLES.

1,118,848.   Specification of Letters Patent.   Patented Nov. 24, 1914.

Application filed December 20, 1911. Serial No. 666,962.

*To all whom it may concern:*

Be it known that I, POWELL EVANS, a citizen of the United States, residing in Philadelphia, Pennsylvania, have invented certain Improvements in Chain-Cases for Motor-Vehicles, of which the following is a specification.

One object of my invention is to provide a relatively light and strong inclosing structure for each of the sprocket chains and its associated radius rod ordinarily used in chain driven motor vehicles; it being also desired to provide structures of novel form which, while properly performing their functions in adjustably limiting the distance between the driving and driven shafts of the vehicle, shall also lend themselves to the inclosure of the others of the parts, such as the chain.

A further object of the invention is to provide novel forms of terminal structures for use as part of the reach or radius rod between the two sprocket-carrying shafts of each wheel of a chain driven motor vehicle, which structures shall be especially adapted to coöperate with a flexible tubular member to effectively inclose the sprocket chain and certain of its associated parts.

Another object of my invention is to provide novel forms of supporting and positioning structures for the shafts of a motor vehicle of the type employing driving chains, which shall freely allow of the various independent movements of the parts occurring under conditions of use and that without causing injurious strains to any part of the mechanism.

Another object of the invention is to provide a novel form of radius or reach rod connection especially adapted for use on chain driven motor vehicles.

These objects and other advantageous ends I secure as hereinafter set forth, reference being had to the accompanying drawings, in which:—

Figure 1, is a plan of the rear portion of the frame of a motor driven truck, illustrating my invention as applied thereto; Fig. 2, is a side elevation of the structure shown in Fig. 1; Fig. 3, is a horizontal section on the line *a—a*, Fig. 2, and Fig. 4, is a vertical section on the line *b—b*, Fig. 1.

In the above drawings, 1 represents the outboard bearing casting of a motor truck and said bearing is rigidly fastened to the transmission box 2, though rotatable in the pillow block 3 attached to the main truck frame 4. This casting 1 serves as a housing for pins 5 and 6 carrying the shoes 7 for the outboard brakes; the pins 6 also serving to support the shackle 8 for the forward end of the rear spring 9. The rear end of this spring is connected through a shackle 10 to a bracket 11 depending from the frame 4.

Assembled through the casting 1 is the driving shaft 12 on which is keyed a chain sprocket 13 rigidly connected with the brake drum 14. Mounted upon this first casting 1, so as to be rotatable in the plane of the chain travel, is a second casting 15 so formed as to constitute one end of a radius or reach rod structure and also serving as one end of the chain inclosing casing. For this purpose said second casting is made, as shown, with a cup-shaped recess or depression 16 at the middle of one side and has openings at the top and bottom for the reception of a pin 17.

Pivoted in the recess 16 is an elongated threaded structure 18 and it is to be noted that the pivot pin 17 is so mounted in its casting as to permit limited oscillation of said structure in a substantially horizontal plane. I preferably make the screw 18 with a square cut thread and mount on it a correspondingly threaded sleeve 19 having a flange 20 provided with peripheral holes for the reception of a spanner wrench. This sleeve is exteriorly threaded, preferably with V-threads, and is designed to enter a second sleeve 21 pivotally connected by a substantially vertical pin 22 to a casting 23; being, after its primary adjustment, immovably held to the sleeve 19 by the clamp 21ᵃ and a key. The casting 23 is rotatably mounted on the rear axle 24 so as to be free to turn in the plane of the chain movement and supports the pins 25, on which are assembled the brakes 26 for the rear wheel 27. Said casting 23 has attached to it a sheet metal housing 28 designed with it to very completely inclose the chain indicated at 29 and the rear sprocket wheel 30 which, in the present instance, is connected to and forms part of the wheel structure 27.

The casting 15 and the housing 28 of the casting 23 are preferably prolonged toward each other and are formed for the reception of a pliable tubular casing 32 made of sheet asbestos, leather, heavy painted canvas, or the like. This latter is preferably riveted to one of the above two members and is held to the other by a retaining wire so as to be conveniently disconnected therefrom at will; it being longitudinally cut or split and overlapped in order that it may be quickly opened to permit of access to the reach rod or chain when desired.

It is to be noted that the rear wheel structure 30 carries a ring 31 fitting into the circular opening in the outer face of the sheet metal housing 28 which, with said ring, the flexible tube, and the casting 15, serves to very completely inclose the driving chain and certain of its associated parts, while permitting of the independent and diverse movements of the two sets of structures respectively assembled upon or adjacent to the driving shaft 12 and the axle 24.

With the above described arrangement of parts an absolutely articulated universal joint is provided between each wheel and its driving shaft 12; the arrangement being such that the said parts may be rapidly assembled without necessitating absolute alinement in the original manufacture.

I claim:

1. The combination of driving and driven members; sprockets respectively for said members; a chain connecting said sprockets; supporting structures for said members; a reach rod extending in the plane of said sprockets and chain and connecting said structures; with a casing inclosing the chain and reach rod and mounted on the supporting structures, one of said structures and its associated parts being mounted to move freely to a limited extent in all directions relatively to the other supporting structure and its parts.

2. The combination in a motor vehicle, of an axle; a wheel mounted thereon; a sprocket for the wheel; a driving shaft; a sprocket for the driving shaft; a chain connecting said two sprockets; a structure mounted to be rotatable concentrically with the driving shaft; a second structure mounted to rotate concentrically with the axle; an adjustable radius rod extending in the plane of said chain and sprockets and connecting said structures; with a casing inclosing the chain and the radius rod and including a flexible portion connecting said two structures.

3. The combination in a motor vehicle, of a driving shaft having a sprocket; a structure surrounding said shaft; a member rotatably mounted thereon; an axle; a second member mounted on the axle; a wheel for the axle; a sprocket for the wheel; a chain connecting said two sprockets; a radius rod pivotally connected to each of the said members and lying in the plane of the chain and sprockets; and a casing for the sprockets and their associated parts including a portion inclosing the radius rod and the chain.

4. The combination in a motor vehicle, of two structures free to rotate to a limited extent; a member consisting of a tube of flexible material connecting both of said structures; a sprocket in each of the structures; a radius rod connecting said structures, and lying in the plane of the chain and sprockets; and a chain connecting the sprockets and with said radius rod extending through said flexible tubular member.

5. The combination in a motor vehicle, of a supporting structure; a driving and a driven member mounted therein; two castings rotatably mounted on the supporting structure respectively concentric with said driving and driven members; mechanism for transmitting power between said members; a radius rod pivotally connected to both of said castings and extending in the plane of the power transmitting mechanism; with a flexible inclosing member extending between said two castings and surrounding said radius rod.

6. The combination of a driving and a driven member; two rotatably supported structures respectively concentric with said members; a chain operatively connecting said two members; two threaded elements rotatably engaging each other and respectively connected to said two structures; and a flexible casing extending between the rotatable structures, said casing inclosing said chain and the threaded elements.

7. The combination of a driving and a driven member; two rotatably supported structures respectively concentric with said members; a chain operatively connecting the two members; a threaded bolt pivoted to one of said structures; with a sleeve rotatably threaded on said bolt and pivotally connected to the other structure.

8. The combination of a driving and a driven member; two rotatably supported structures respectively concentric with said members; a chain operatively connecting the two members; a threaded bolt pivoted to one of said structures; a threaded sleeve pivoted to the other structure; and a second sleeve threaded both to the bolt and to the first sleeve.

In testimony whereof, I have signed my name to this specification, in the presence of two subscribing witnesses.

POWELL EVANS.

Witnesses:
CLYDE T. MOYER,
WM. E. SHUPE.